United States Patent [19]

Zwack et al.

[11] Patent Number: 5,430,707
[45] Date of Patent: Jul. 4, 1995

[54] METHOD AND APPARATUS FOR COMMUNICATING OPERATING INFORMATION BETWEEN CENTRALIZED AND DECENTRALIZED EQUIPMENT OF A COMMUNICATION SYSTEM

[75] Inventors: Eduard Zwack, Puchheim; Peter Strohmeier, Munich; Friedrich Geissler, Wolfratshausen; Juergen Heitmann, Munich, all of Germany

[73] Assignee: Siemens Aktiengesellschaft, Munich, Germany

[21] Appl. No.: 240,092

[22] Filed: May 9, 1994

Related U.S. Application Data

[63] Continuation of Ser. No. 707,648, May 30, 1991, abandoned.

[30] Foreign Application Priority Data

Jun. 1, 1990 [EP] European Pat. Off. ............ 90110485

[51] Int. Cl.[6] .............................................. H03K 7/08
[52] U.S. Cl. ............................................. 370/9; 370/8; 375/238
[58] Field of Search ................. 370/8, 9, 10, 110.1, 370/110.4; 375/22–25; 340/825.24, 825.25, 825.26, 825.63, 825.57, 825.61, 825.64, 825.65; 377/41, 107, 104, 118, 96; 359/184, 185, 264; 371/57.2

[56] References Cited

U.S. PATENT DOCUMENTS

| | | | |
|---|---|---|---|
| 3,988,543 | 10/1976 | Dall'Olio et al. | 370/8 |
| 4,070,550 | 1/1978 | Miller, Jr. et al. | 370/8 |
| 4,502,143 | 2/1985 | Kato et al. | 375/22 |
| 4,577,308 | 3/1986 | Larson et al. | 370/9 |
| 4,729,066 | 3/1988 | Nelson et al. | 370/8 |
| 4,731,781 | 3/1988 | Nakamura | 370/9 |
| 4,941,198 | 7/1990 | Johnson et al. | 370/110.4 |
| 5,052,037 | 9/1991 | Perelman | 370/9 |
| 5,091,725 | 2/1992 | Gard | 375/22 |

FOREIGN PATENT DOCUMENTS

0075727 4/1984 Japan ...................... 370/8

OTHER PUBLICATIONS

Beckinger et al, "Hardware-Struktur des HICOM–Kommunikationscomputers", ISDM im Büro–HICOM 2323 Telcom Report, 1985, pp. 58–66.

Primary Examiner—Douglas W. Olms
Assistant Examiner—Dang Ton
Attorney, Agent, or Firm—Hill, Steadman & Simpson

[57] ABSTRACT

At least one connection for the communication exchange and one connection for the communication of frame clock signals is provided between centralized equipment, for example a switching matrix network, and decentralized equipment, for example line trunk groups. The frame clock signals indicate the beginning of a transmission frame utilized for the channel-oriented communication exchange. The operating condition information, for example equipment is "active" or "inactive" are communicated by pulse-duration or pulse-pause modulated or by n-coded pulse duration or pulse-pause-modulated frame clock signals.

15 Claims, 1 Drawing Sheet

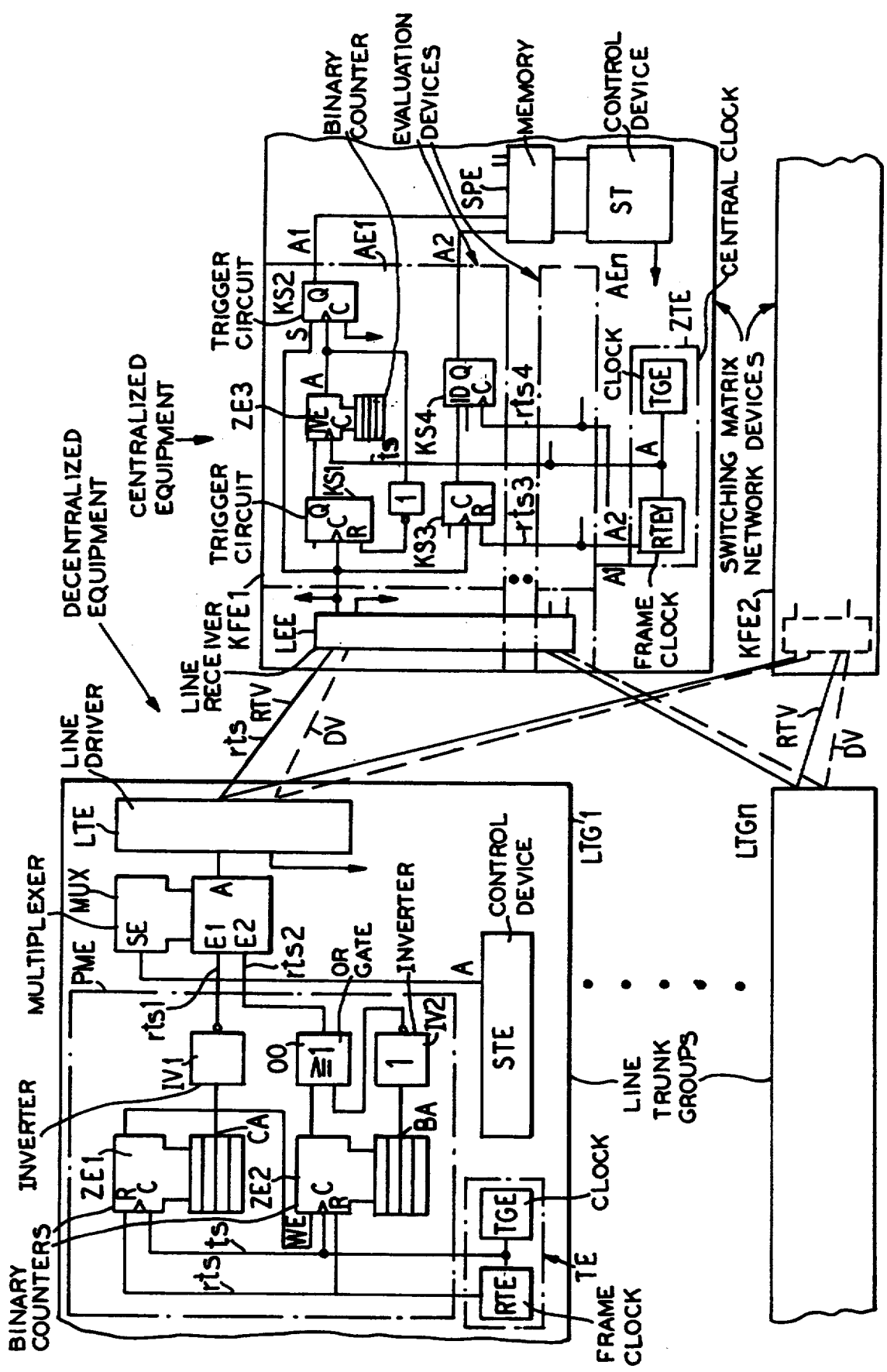

METHOD AND APPARATUS FOR COMMUNICATING OPERATING INFORMATION BETWEEN CENTRALIZED AND DECENTRALIZED EQUIPMENT OF A COMMUNICATION SYSTEM

This is a continuation of application Ser. No. 707,648, filed May 30, 1991 now abandoned.

BACKGROUND OF THE INVENTION

1. Field of the Invention:

The present invention relates to a method and apparatus for communicating operating condition information between centralized and decentralized equipment, each respectively equipped with a control device, in a communication system, whereby at least one connection is provided between such equipment for a channel-oriented communication exchange within a transmission frame and a connection is provided between such equipment for the communication of frame clock signals that indicate the beginning of a frame with clock signal edges.

2. Description of the Prior Art

A communication system of the type set forth above is generally known from the publication "ISDN im Buero-HICOM" of Siemens AG. In this communication system, i.e. in the HICOM communication system, decentralized equipment such as, for example, line units are connected by way of what are referred to as 2 Mbit/s voice and data multiplex channels to the central equipment such as, for example, a central switching matrix array (see FIG. 2 and the appertaining description on Page 59). The 2 Mbit/s voice or, respectively, data multiplex channels are thereby divided into 30 useful channels of 64 Kbit/s each and into a signaling channel of 64 Kbit/s. The 64 Kbit/s useful channels are provided for the communication of pulse code-modulated (PCM) voice information or data information. Respectively, 8 bits of the 2 Mbit/s bit stream encompassing 32×64 Kbit/S channels are allocated to a transmission frame. The frame clock signals representing a transmission frame thereby have a repetition frequency of 8 KHz. Given longer transmission lengths, these frame clock signals are communicated with the assistance of involved scrambler methods and, given the relatively-short connections between the equipment of a communication system, are communicated via connections to the appertaining equipment separately provided for this purpose. Usually, the positive edge of the frame clock signals inform the device that receives the data or, respectively, data signals, of the beginning of a frame or, respectively, of the beginning of the first useful channel.

Furthermore, control means are provided in the respective equipment of the communication system for controlling the switching-oriented, operations-oriented and safeguarding-oriented events in the respective equipment. These control devices communicate via signaling channels provided for this purpose, whereby the information are communicated by an HDLC transmission procedure (see FIG. 2, Page 59 of the publication "ISDN im Buero, HICOM"). Within the framework of an operations-oriented information exchange, operating condition information such as, for example, "equipment is active or inactive, equipment is in standby or hot standby mode or equipment is malfunctioning" are communicated via these signaling channels. Involved signaling and transmission programs are required for the communication of such operating condition information, particularly from decentralized equipment to centralized equipment of a communication system. In addition, these operating condition information can only be communicated given undisturbed transmission or, respectively, signaling programs and, in addition, represent an additional traffic load on the signaling channels that are already overloaded.

SUMMARY OF THE INVENTION

The object of the present invention, therefore, is to provide a communication system of the type defined above such that an optimally trouble-free communication of the operating condition information between the equipment, particularly the decentralized and the centralized equipment, is achieved given minimum realization expense.

According to the present invention, the above object is achieved in a communication system of the type generally set forth above in a method for communicating operating condition information between centralized and decentralized equipment respectively equipped with a control device in such a communication system, whereby at least one connection for a channel-oriented communication exchange within a transmission frame and a connection for the communication of the beginning of a frame with frame clock signals indicating clock signal edges are provided between such equipment, the method being particularly characterized in that the operating condition information are communicated by pulse-duration or by pulse pause-modulated frame clock signals. Pulse pause refers to the spacing between pulses and pulse pause modulation refers to modulation of the spaces between pulses.

The critical aspect of the method of the present invention may be seen therein that the operating condition information are communicated with the frame clock signals on the basis of pulse-duration or, respectively, pulse-code modulation of the frame clock signals, whereby an additional load on the overloaded signaling channels is avoided.

A particular advantage of the method of the invention is that the communication of operating condition information, even given disturbed safeguarding-oriented or, respectively, operations-oriented program executions, as a result whereof an extremely-reliable communication of the operating condition information is effected.

A further advantage of the method of the present invention may be seen in the simple realization thereof on the basis of standard integrated circuit technology. In addition to this, the circuit components employed can be simply realized in user-programmable or user-specifiable integrated circuits.

When the method of the present invention is provided for the communication of a plurality of operating condition information, then such operating condition information can be communicated with the assistance of n coded pulse-duration or pulse pause-modulated frame clock signals. This development of the method of the present invention can be particularly simply realized with commercially-available integrated coder or, respectively, decoder circuits.

A critical operating condition, namely "equipment present or not present", is indicated in the method of the invention by the transmission or, respectively, non-transmission of the frame clock signals of the respective equipment by the transmission or, respectively, non-transmission of pulse-duration or pulse pause-modulated frame clock signals.

In order to inform the centralized equipment of redundantly-provided centralized and/or decentralized equipment of the operating conditions of the decentralized equipment, each decentralized equipment is advantageously connected to each centralized equipment via a connection that communicates frame clock signals in that the method is particularly characterized in that the operating condition information which indicate active or inactive operating conditions of equipment, standby or hot standby operating conditions of respective standby equipment, or a malfunctioning operating condition and/or detail malfunctioning operating conditions of the respective equipment is indicated, what is hereby achieved is that each centralized equipment is simultaneously informed of the operating conditions of the decentralized equipment connected thereto.

Two different arrangements are to be fundamentally involved in a realization of the method of the invention. One arrangement is thereby provided in those equipment in which the respective operating conditions are acquired and the frame clock signals formed in such equipment are pulse-duration or pulse pause-modulated dependent on the operating condition in accordance with the method of the invention. A further arrangement that fundamentally differs from the first arrangement is realized in those equipment of a communication system in which the communicated frame clock signals are received and the operating conditions of the remote equipment are identified from the pulse durations or, respectively, pulse pauses of the received frame clock signals and are subsequently stored.

In the equipment wherein pulse-duration or, respectively, pulse pause-modulated frame clock signals are to be formed, the different pulse durations or, respectively, pulse pauses are formed with the assistance of a pulse modulation device which, in accordance with the method of the invention, is particularly characterized in that a clock device that generates frame clock signals and higher-frequency clock signals in comparison to the frequency of the frame clock signals is arranged in the equipment of the communication system wherein pulse-duration or, respectively, pulse pause-modulated frame clock signals are to be formed, in that the output carrying the frame clock signals and the output of the clock device carrying the higher-frequency clock signals are connected to a pulse modulation device that forms at least two pulse-pause or, respectively, pulse-duration modulated frame clock signals, the outputs of the pulse modulation device carrying the frame clock signals having different pulse durations are each connected to an input of a multiplexer, in that at least one control input of the multiplexer is connected to at least one output of a control device of the respective equipment that indicates different operating conditions, whereby pulse-duration or, respectively, pulse pause-modulated frame clocks are available at the output of the multiplexer whose pulse duration or, respectively, pulse pause respectively represents the current operating condition of the respective equipment.

The pulse modulation device is supplied with clock signals that have a higher frequency in comparison to the frequency of the frame clock signals. The data bit clock signals utilized for the formation of the data clock signals are thereby very advantageously co-employed for this purpose. A separate frame clock signal having a corresponding pulse duration or, respectively, pulse length is generated in the pulse modulation device for each operating condition. These different pulse-duration or, respectively, pulse pause-modulated frame clock signals are fed to a multiplexer. The control inputs of the multiplexer are connected to the control inputs of the respective equipment. The multiplexer device is controlled via the control inputs such that only the pulse-duration or, respectively, pulse pause-modulated frame clock signals corresponding to the respective operating conditions proceed to the output of the multiplexer.

The pulse-duration modulation device is particularly advantageously realized with a binary counter and with logic elements connected to the binary outputs thereof in an arrangement for implementing the method of the invention and is particularly characterized in that, in a pulse modulation device forming two different pulse-duration modulated frame clock signals, that input carrying the frame clock signals or, respectively, that input carrying the clock signals of higher frequency, is respectively connected to a reset input or, respectively, to a clock input of a first end of a second binary counter, in that the binary outputs of the binary counter carrying the binary intermediate counter results are connected to logic elements that form the prescribed pulse duration, and that the outputs of the logic elements that carry different pulse-duration-modulated frame clock signals represent the outputs of the pulse modulation device. The clock signals at a clock input of the binary counter are thereby controlled and counted therein. Dependent on the operation of the binary outputs of the counter, different pulse durations or, respectively, pulse pauses are thereby realized. The counter device is thereby reset into an initial condition of count start by the positive edge signals of the frame clock signals.

An evaluation device with which at least two different pulse pauses can be recognized and/or with which the presence of frame clock signals is checked is arranged in an equipment of the communication system wherein the pulse duration or, respectively, pulse pause-modulated frame clock signals are to be recognized in an arrangement for implementing the method of the invention which is particularly characterized in that the equipment of a communication system wherein pulse-duration or, respectively, pulse pause-modulated frame clock signals are to be recognized, and which at least one evaluation device is provided that recognizes at least two different pulse pauses or, respectively, pulse durations or n-coded pulse pauses or, respectively, pulse durations and/or that checks the presence of frame clock signals is arranged for at least one further equipment connected to this equipment. In each evaluation device which is connected to an output of a central clock device that forms clock signals having a higher frequency in comparison to the frequency of the pulse pause or, respectively, pulse duration-modulated frame clock signals, and is connected to further outputs of the central clock device that forms phase-offset frame clock signals, and further frame clock signals derived from the clock signals. The outputs of the evaluation device having a voltage potential corresponding to the operating condition information are connected to a memory that stores the operating condition information, whereby the write-in and read-out of the operating condition information are controlled by a central controller of the respective equipment that is correspondingly connected to the memory. The operating conditions are realized by different voltage potentials at the outputs of the evaluation device. These voltage potentials are stored in the memory. The control and reading of the operating condition potentials or, respectively, operating condition information is implemented by a control device of the respective equipment that is connected to the memory. A particularly advantageous realization of an evaluation device in which only two different pulse durations or, respectively, pulse pauses are to be recognized, and the presence of frame clock signals is to be checked, is achieved the utilization of a counter, of four trigger circuits and of an inverter in an arrangement for implementation of the method of the invention which is particularly characterized in that, given an evaluation device that recognizes two different pulse durations or, respectively, pulse pauses and checks for the presence of pulse-duration or, respectively, pulse pause-modulated frame clock signals, the input of the evaluation device is connected to a clock input of a first trigger circuit, to a setting input of a second trigger circuit and to a clock input of a third trigger circuit, in that the output of the first trigger circuit is connected to an active input of a third binary counter, in that the clock signals are connected to a clock input of the third binary counter, in that the output of the third counter is connected both to a clock input of the second trigger circuit as well as to via a first inverter to a reset input of the first trigger circuit, in that the output of the second trigger circuit represents that output of the evaluation device representing the operating conditions, in that the reset input of the third trigger circuit is connected to an output of the central clock that carries further frame clock signals. A clock input of a fourth trigger circuit is connected to a further output of the central clock device that carries the phase offset frame clock signals and the output of the third trigger circuit is connected to a D input of the fourth trigger circuit. The output of the fourth trigger circuit represents that output of the evaluation device that represents the presence of the frame clock signals.

With the assistance of the counter device, a pulse is formed in the evaluation device with a pulse duration that lies between the two pulse durations of the frame clock signals that represent the operating conditions. When the pulse duration of the frame clock signal falls below that formed in the evaluation device, then a corresponding voltage potential is driven at an output of the evaluation device. Analogous thereto, when the pulse duration of the frame clock signals is downwardly transgressed in comparison to the pulse durations of the internally-formed signals, a voltage potential differing from the preceding operating conditions is driven at the output of the evaluation device. The presence of the frame clock signals is checked with the assistance of the two trigger circuits. Since the presence of the frame clock signals can only be checked during the pulse durations of the supplied frame clock signals, the frame clock signals supplied to the trigger circuits must have a lower frequency, at least half the frequency when compared to the frequency of the incoming frame clock signals.

In accordance with a particularly advantageous feature and development of the invention, the multiplexer circuit is followed by a line driver device that edits the frame clock signals in view of voltage levels and pulse shape for transmission, whereby the output of the line driver device is connected to the transmission medium that communicates the frame clock signals in an arrangement of the type described above for the implementation of the method of the invention and which is particularly characterized in that the output of the multiplexer circuit is connected to the line driver device that edits pulse pause or, respectively, pulse duration-modulated frame clock signals in view of voltage level and in view of pulse shape for transmission, and in that the output of the line driver device is connected to a transmission medium that implements the communication of the pulse duration or, respectively, pulse pause-modulated frame clock signals. Analogous thereto, the evaluation device is preceded by a line receiving device in which the incoming frame clock signals are regenerated and converted into voltage potentials suitable for processing. The input of the line receiving device is connected to the transmission medium that communicates the frame clock signals. The frame clock signals can be communicated over great distances, a maxima of about 300 meters, with the assistance of the line driver device and the line receiver.

BRIEF DESCRIPTION OF THE DRAWING

Other objects, features and advantages of the invention, its organization, construction and operation will be best understood from the following detailed description, taken in conjunction with the accompanying drawing on which there is a single figure which is a schematic representation of centralized and decentralized equipment of a communication system, particularly a digital communication private branch exchange (PBX).

DESCRIPTION OF THE PREFERRED EMBODIMENTS

Referring to the drawing, a communication system (here including a PBX) and specifically showing a centralized and decentralized equipment is illustrated, particularly that for a digital communication PBX. For example, line trunk groups LTG1-LTGn are illustrated to which different subscriber terminal equipment (not shown) can be connected are decentralized equipment of the communication system. For example, centralized switching matrix equipment KFE1, KFE2 are connected thereto and represent centralized equipment of the communication system. For dependability-oriented reasons, these central (switching matrix) equipment are redundantly provided. A data connection DV (indicated by broken lines) respectively acting in the direction of the switching matrix network equipment KFE1, KFE2 and provided for the communication exchange and the respective frame clock connection RTV communicating pulse-duration or, respectively, pulse pause-modulated frame clock signals rts are respectively provided between each line trunk group LTG1-LTGn and each of the two switching matrix network equipment KFE1, KFE2. The data and frame clock signal connections DV, RTV that act in the direction of the line trunk groups LTG1-LTGn are not shown. It is to be assumed here, for the exemplary embodiment illustrated that the operating conditions, active and inactive, for each of the line trunk groups LTG1-LTGn and the presence of a respective line trunk group LTG are communicated to the central switching matrix network equipment KFE1, KFE2. In accordance with the method of the invention, the two operating conditions are communicated to the central switching matrix network equipment KFE1, KFE2 from a line trunk group LTG on the basis of frame clock signals rts having different pulse duration or, respectively, pulse pauses. Standing for and representing all other line trunk groups LTG1-LTGn, an arrangement of the present invention is shown in the first line trunk group LTG1 on the drawing. A clock generator TGE, simply referenced clock, is arranged in the line trunk group LTG1. Clock signals ts having a frequency that corresponds to the data bit clock frequency of the data to be communicated via the data connection DV are formed in the clock TGE. Given a standard transmission rate of 2048 Mbit/S, clock signals having a frequency of 2048 MHz are consequently formed in the clock TGE. These clock signals ts proceed via a corresponding connection to a frame clock device RTE. Frame clock signals rts are generated in the frame clock device RTE. The positive edge of the frame clock signals rts thereby indicate the beginnings of respective transmission frames. Given a transmission rate of 2048 Mbit/s for the data and a division into 32×64 Kbit/s voice or data channels, a frequency of 8 KHz results for the frame clock signals rts given an assignment of 8 bits per data or, respectively, voice channel. Together, the clock generator device TGE and the frame clock device RTE form the clock device TE. The frame clock signals rts are supplied via a corresponding connection to a reset input R of a first binary counter ZE1 and a second binary counter ZE2. A clock input c of the first binary counter ZE1, and of a second binary counter ZE2 is respectively connected to the output of the clock generator device TGE that carries the clock signals ts. A binary modulo 16 counter ZE1, ZE2 is provided in the exemplary embodiment. The output of the first binary counter ZE1 is connected to an active input we of the second binary counter ZE2. With the beginning of the positive edge change of the frame clock signals rts, the clock signals ts applied at the clock input c are first counted in the first binary counter ZE1. After the sixteenth counting event implemented in the first binary counter ZE1, the second binary counter ZE2 is activated via the output of the first binary counter ZE1, i.e. the counting of the clock signal ts is initiated. A first inverter IV1 is connected to a $2^3$ binary output (CA) of the first binary counter ZE1. Pulse pause-modulated frame clock signals rst1 having a pulse duration covering $2^3$ i.e. covering 8 clock signal intervals are present at the output of the first inverter IV1. A second inverter IV2 is connected to a $2^2$ binary output BA of the second binary counter ZE2. Both the output of the second inverter IV2 and the output of the second binary counter ZE2 are respectively connected to a respective input of an OR gate OD. Pulse-duration-modulated frame clock signals rst2 having a pulse duration covering 20 clock signal intervals are present at the output of the OR gate OD. The output of the first inverter IV1 is connected to a first input E1 and the output of the OR gate OD is connected to a second input E2 of a multiplexer MUX. A control input SE of a multiplexer MUX is connected to an output A of a control device STE of the first line trunk group LTG1. It is thereby assumed for this exemplary embodiment that all operating conditions, both program-oriented conditions and circuit-oriented conditions, are reported to the control device STE and the multiplexer MUX is influenced by the control device STE via the output A in accordance with the operating conditions. For example, the operating conditions of the devices may be active, inactive, hot standby, malfunction and detail malfunction. In the exemplary embodiment, for example, the operating condition "active" is assigned to the pulse durations of the frame clock signals rts1 according to 8 clock signal intervals and the operating condition "inactive" is assigned to the pulse intervals of the frame clock signals rts2 corresponding to 20 clock signal intervals. Dependent on the operating conditions, consequently, the frame clock signals rts1, rts2 applied at the first or second input E1, E2 of the multiplexer MUX is driven to the output A thereof. The output A of the multiplexer MUX is connected to a line driver LTE. The pulse-duration-modulated frame clock signals rts1, rts2 are edited in the line driver LTE in view of pulse shape and in view of voltage level for the transmission via the frame clock connection RTV connected to an output of the line driver LTE.

The individual components of the arrangement can be realized as follows by integrated circuits in advanced low-power Schottky technology: the first and second binary counters ZE1, ZE2 by 74 ALS 163 circuits; the first and second inverters IV1, IV2 by 74 ALS 04 circuits; the OR gate OD by a 74 ALS 32 circuit; the multiplexer MUX by a 74 ALS 257 circuit; and the line driver LTE by a 74 BCT 8374 circuit. Given utilization of the integrated circuit 74 ALS 163, a transfer input can also be used for the resetting instead of the reset input R illustrated on the drawing. Given a defined information state at the transfer inputs, a binary information available at the binary inputs of the integrated circuit is thereby driven to the binary outputs of the integrated circuit. When the binary inputs are connected to a low potential, the transfer of this binary information to the binary outputs corresponds to a resetting.

The apparatus components of the first switching matrix network device KFE1 that are otherwise realized identically to the second switching matrix network device KFE2 are also shown on the drawing for explaining the requirements of a method of the present invention. The pulse duration-modulated frame clock signals rts1, rts2 communicated via the frame clock connection RTV proceed to a line receiver LEE, the incoming pulse duration-modulated frame clock signals rts1, rts2, being regenerated and matched to a voltage level suitable for further processing. The regenerated, pulse duration-modulated frame clock signals rts1, rts2 proceed to an input E of a first evaluation device AE1. Analogous thereto, the pulse duration-modulated frame clock signals rts1, rts2 incoming from the other trunk line groups LTG2-LTGn are conducted via the line receiver LEE to a respective evaluation device AE2-AEn. The further evaluation devices AE2-AEn are identically constructed and are therefore not set forth in detail on the drawing. The input E of the first evaluation device AE1 is connected to a clock input C of a first trigger circuit KS1, to a setting input S of a second trigger circuit KS2 and to a clock input C of a third trigger circuit KS3. The output Q of the first trigger circuit KS1 is connected to an active input WE of a third binary counter ZE3. Analogous to the first and second counters ZE1, ZE2, the third binary counter ZE3 represents a binary modulo 16 counter device ZE3. Clock signals ts proceed via a corresponding connection to the clock input C of the third binary counter ZE3. These clock signals ts are formed in a clock generator TGE realized in an identical manner as in the line trunk groups LTG and, likewise, have a frequency of 2048 Mbit/s. The output A of the binary third counter ZE3 is conducted to a clock input C of the second trigger circuit KS2 and is conducted via a third inverter IV3 to a reset input R of the first trigger circuit KS1. The output Q of the second trigger circuit KS2 is connected to a first output A1 of the first evaluation device AE1. Dependent on the pulse duration of the communicated frame clock signals rts1, rts2, high potential or low potential is applied at the first output A1. The reference pulse interval required for identifying the pulse durations of the frame clock signals rts1, rts2 is formed with the assistance of the third binary counter ZE3. For the purpose of identifying the pulse duration of the communicated pulse duration-modulated frame clock signals rts1, rts2, the low potential applied at the set input S is driven to the output Q of the second trigger circuit KS2 after 16 counting steps as a result of the positive signal edge appearing at the output A of the third binary counter ZE3 given frame clock signals rts1 having a shorter pulse duration and, given pulse duration-modulated frame clock signals rts2 that exceed 16 pulse durations, the positive potential applied at the set input S is driven to the output Q of the second trigger circuit KS2.

The output Q of the third trigger circuit KS3 is connected to a D input 1D of a fourth trigger circuit KS4. The output of the fourth trigger circuit KS4 represents the second output A2 of the first evaluation device AE1. A reset input R of the third trigger circuit KS3 is connected to a first output A1 of a first frame clock device RTEY. A second output A2 of this frame clock device RTEY is connected to a clock input C of the fourth trigger circuit KS4. Furthermore, the clock signals ts generated in the clock generator TGE are driven to the further frame clock device RTEY. Further frame clock signals RTS3, RTS4 are formed in the further frame clock device RTEY, these further frame clock signals rts3, rts4 having at least half the frequency in comparison to the frequency of the pulse duration-modulated frame clock signals rts1, rts2 formed in the line trunk groups LTG. Together, the clock generator device TGE and the further frame clock device RTEY form a central clock ZTE. In addition, the clock signal rts4 present at the second output A2 has a given chronological delay in comparison to the further frame clock signal rts3 applied at the first output A1. Due to the halving of the frequency of the frame clock signals rts3, rts4, formed in the further frame clock device RTEY, what is achieved is that the presence of frame clock signals rts1, rts2, communicated from the line trunk groups LTG are identified within a pulse duration of the further frame clock signals rts3, rts4 formed in the further frame clock device RTEY. The information present at the output Q of the third trigger circuit KS3 is transferred chronologically offset to the output Q of the fourth trigger circuit KS4. The presence of pulse duration-modulated frame clock signals rts1, rts2 and, therefore, the presence of the respective line trunk groups LTG is determined with the assistance of the third and fourth trigger circuits KS3, KS4. Positive voltage potential at the second output A2 of the evaluation device AE1 therefore indicates the presence of the respective line trunk group LTG1. Both the first, as well as the second output A1, A2 of the first evaluation device AE1 are each respectively connected to an input of a memory SVE. This is, in turn, connected to a control device ST. Both the write-in of the operating condition information in the reading of this information are accomplished by the control device ST. The outputs of the memory device SPE can be operated with one another via suitable logic elements such that only a single connection is connected to the control device ST. Whether all connected line trunk groups are in the "active" or, respectively, more line trunk groups LTG are in the "inactive" condition is indicated with the transmission of coded information regarding this single connection.

The components of the first evaluation device AE1 as well as the memory device SPE can, analogous to the components of the line trunk groups LTG, be realized as follows by integrated circuits in advanced low-power Schottky technology: the third counter ZE3 may be a 74 ALS 163 circuit; the first through fourth trigger circuits KS1–KS4 may be constructed with 74 ALS 74 circuits; the third inverter IV3 may be provided by a 74 ALS 04 circuit; and the memory SPE may be constituted a 74 BCT 8374 circuit.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for communicating operating condition information between centralized equipment and decentralized equipment in a communication system, the centralized equipment and the decentralized equipment being respectively equipped with a control device, in which at least one connection for channel-oriented and transmission frame-oriented communication is provided between the centralized equipment and the decentralized equipment and at least one connection for communication of a beginning of a frame with frame clock signals indicating clock signal edges is provided between the centralized equipment and the decentralized equipment, the improvement therein comprising the steps of:

modulating the frame clock signals, such that the modulated frame clock signals contain operating condition information indicative of an operating condition that is currently occurring in the centralized equipment or in the decentralized equipment, with one of pulse-duration modulation and pulse-pause modulation; and transmitting the modulated frame clock signals to the decentralized equipment or the centralized equipment, respectively.

2. The improved method of claim 1, wherein:
 the step of modulating is further defined as forming the operating condition information with n-coded frame clock signals.

3. The improved method of claim 2, wherein: the step of transmitting defines the presence or absence of the decentralized equipment by the presence of transmission or the absence of transmission of the modulated frame clock signals.

4. The improved method of claim 3, wherein the centralized and/or decentralized equipment are redundant and further comprising the step of:
 providing a separate connection between each decentralized equipment and each centralized equipment for the transmission of the modulated frame clock signals.

5. Apparatus for communicating operating condition information between centralized equipment and decentralized equipment in a communication system, comprising:

a transmission medium connected between said centralized equipment and said decentralized equipment including at least one connection for channel-oriented communication and transmission frame-oriented and at least one connection for communication of a beginning of a frame with frame clock signals indicating clock signal edges;

clock means in said decentralized equipment for generating frame first clock signals at a first predetermined frequency and second clock signals at a second predetermined frequency that is higher than said first predetermined frequency;

pulse modulation means in said decentralized equipment connected to said clock means to receive said first and second clock signals and produce first and second modulated pulse signals, said pulse modulation means modulating said first and second clock signals with one of pulse-duration modulation and pulse-pause modulation;

a multiplexer in said decentralized equipment connected to said pulse modulation means to receive the first and second modulated pulse signals, said multiplexer including a control input;

a control device in said decentralized equipment connected to said control input of said multiplexer and producing control signals indicating respective operating conditions and which operate said multiplexer to output the modulated frame clock signals which represent an operating condition that is currently occurring in equipment of the decentralized equipment.

6. The arrangement of claim 5, wherein said pulse modulation means comprises:

first and second binary counters each including a clock input, a reset input and a binary output;

said clock means comprises a first output for said first clock signals connected to said reset inputs of said first and second binary counters, and a second output for said second clock signals connected to said clock inputs of said first and second binary counters; and a logic circuit connected to said binary outputs and operable to form the first and second modulated pulse signals from the signals on said binary outputs as different modulated frame clock signals representing the outputs of said pulse modulation means.

7. The arrangement of claim 5, wherein said centralized equipment comprises:

at least one evaluation means for recognizing n-coded modulations including at least two different pulse pauses or pulse durations and checking the presence of frame clock signals of the centralized equipment connected thereto;

each of said evaluation means comprising a first input for receiving clock signals and a second input for receiving frame clock signals;

a further clock means for generating frame clock signals of a first predetermined frequency, clock signals of a second predetermined frequency which is higher than said first predetermined frequency and phase-offset frame clock signals;

said further clock means connected to said evaluation means;

said evaluation means responsive to the transmitted frame clock signals and the frame and clock signals of said decentralized equipment to recognize the n-coded modulated frame clock signals;

a memory storing operating condition information, said memory connected to and operated by said evaluation means to indicate the operating condition that is currently occurring; and a control device connected to said memory for controlling writing and reading of said operating condition information.

8. The arrangement of claim 7, wherein the evaluation means recognizes two different pulse pauses or pulse durations, each of said evaluation means comprising:

first, second, third and fourth trigger circuits, each of said first, second and third trigger circuits including a clock input, a setting input, and a reset input and an output;

said fourth trigger circuit including a D input, a clock input and an output, said D input connected to said output of said third trigger circuit and said output connected to said memory, said clock input connected to said clock means to receive the phase-offset frame clock signals;

an input for receiving signals from said centralized equipment, said input connected to said clock inputs of said first and third trigger circuits and to said set input of said second trigger circuit;

an inverter; and a binary counter including an active input connected to said output of said first trigger circuit, a clock input connected to said clock means to receive the clock signals and an output connected to said clock input of said second trigger circuit and via said inverter to said reset input of said first trigger circuit, said output of said second trigger circuit connected to said memory, as is said output of said fourth trigger circuit, to provide operating condition information thereto.

9. The arrangement of claim 8, and further comprising:

a line driver connected between said multiplexer and communication connections of said transmission medium for editing transmission pulses with respect to voltage level and shape.

10. The arrangement of claim 8, and further comprising:

a receiving device connected between said communication connections of said transmission medium and an input of said evaluation means for converting voltage potentials and regenerating shapes of received pulses.

11. Apparatus for communicating operating condition information between centralized equipment and decentralized equipment in a communication system, comprising:

a transmission medium connected between said centralized equipment and said decentralized equipment including at least one connection for channel-oriented communication and transmission frame-oriented and at least one connection for communication of a beginning of a frame with frame clock signals indicating clock signal edges;

clock means in said decentralized equipment for generating frame first clock signals at a first predetermined frequency and second clock signals at a second predetermined frequency that is higher than said first predetermined frequency;

pulse modulation means in said decentralized equipment connected to said clock means to receive said first and second clock signals and produce first and second modulated pulse signals, said pulse modulation means modulating said first and second clock signals with one of pulse-duration modulation and pulse-pause modulation;

a multiplexer in said decentralized equipment connected to said pulse modulation means to receive the first and second modulated pulse signals, said multiplexer including a control input;

a control device in said decentralized equipment connected to said control input of said multiplexer and producing control signals indicating respective operating conditions and which operate said multiplexer to output the modulated frame clock signals which represent an operating condition that is currently occurring in equipment of the decentralized equipment;

said centralized equipment having, at least one evaluation means for recognizing n-coded modulations including at least two different pulse pauses or pulse durations and checking the presence of frame clock signals of the decentralized equipment connected thereto, each of said evaluation means having a first input for receiving clock signals and a second input for receiving frame clock signals, a further clock means for generating frame clock signals of a first predetermined frequency, clock signals of a second predetermined frequency which is higher than said first predetermined frequency and phase-offset frame clock signals;

said further clock means connected to said evaluation means;

said evaluation means responsive to the transmitted frame clock signals and the frame and clock signals of said decentralized equipment to recognize the n-coded modulated frame clock signals;

a memory storing operating condition information, said memory connected to and operated by said evaluation means to indicate the operating condition that is currently occurring; and a control device connected to said memory for controlling writing and reading of said operating condition information.

12. The arrangement of claim 11, wherein the evaluation means recognizes two different pulse pauses or pulse durations, each of said evaluation means comprising:

first, second, third and fourth trigger circuits, each of said first, second and third trigger circuits including a clock input, a setting input, and a reset input and an output;

said fourth trigger circuit including a D input, a clock input and an output, said D input connected to said output of said third trigger circuit and said output connected to said memory, said clock input connected to said further clock means to receive the phase-offset frame clock signals;

an input for receiving signals from said decentralized equipment, said input connected to said clock inputs of said first and third trigger circuits and to said set input of said second trigger circuit;

an inverter; and a binary counter including an active input connected to said output of said first trigger circuit, a clock input connected to said further clock means to receive the clock signals and an output connected to said clock input of said second trigger circuit and via said inverter to said reset input of said first trigger circuit, said output of said second trigger circuit connected to said memory, as is said output of said fourth trigger circuit, to provide operating condition information thereto.

13. The arrangement of claim 12, and further comprising:

a line driver connected between said multiplexer and communication connections of said transmission medium for editing transmission pulses with respect to voltage level and shape.

14. The arrangement of claim 12, and further comprising:

a receiving device connected between said communication connections of said transmission medium and an input of said evaluation means for converting voltage potentials and regenerating shapes of received pulses.

15. The arrangement of claim 11, wherein said pulse modulation means comprises:

first and second binary counters each including a clock input, a reset input and a binary output;

said clock means comprises a first output for said first clock signals connected to said reset inputs of said first and second binary counters, and a second output for said second clock signals connected to said clock inputs of said first and second binary counters; and a logic circuit connected to said binary outputs and operable to form the first and second modulated pulse signals from the signals on said binary outputs as different modulated frame clock signals representing the outputs of said pulse modulation means.

* * * * *